Oct. 20, 1931.    E. F. ROSSMAN    1,828,446
SHOCK ABSORBER
Filed Jan. 4, 1930
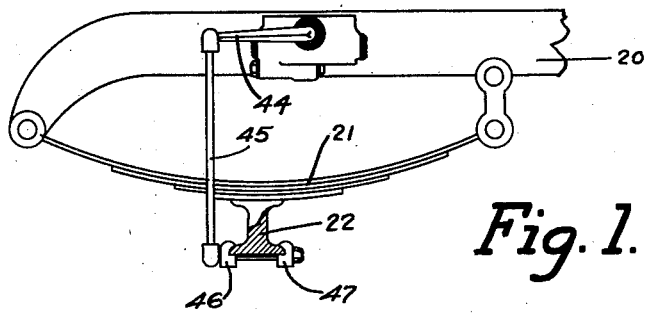
Fig. 1.
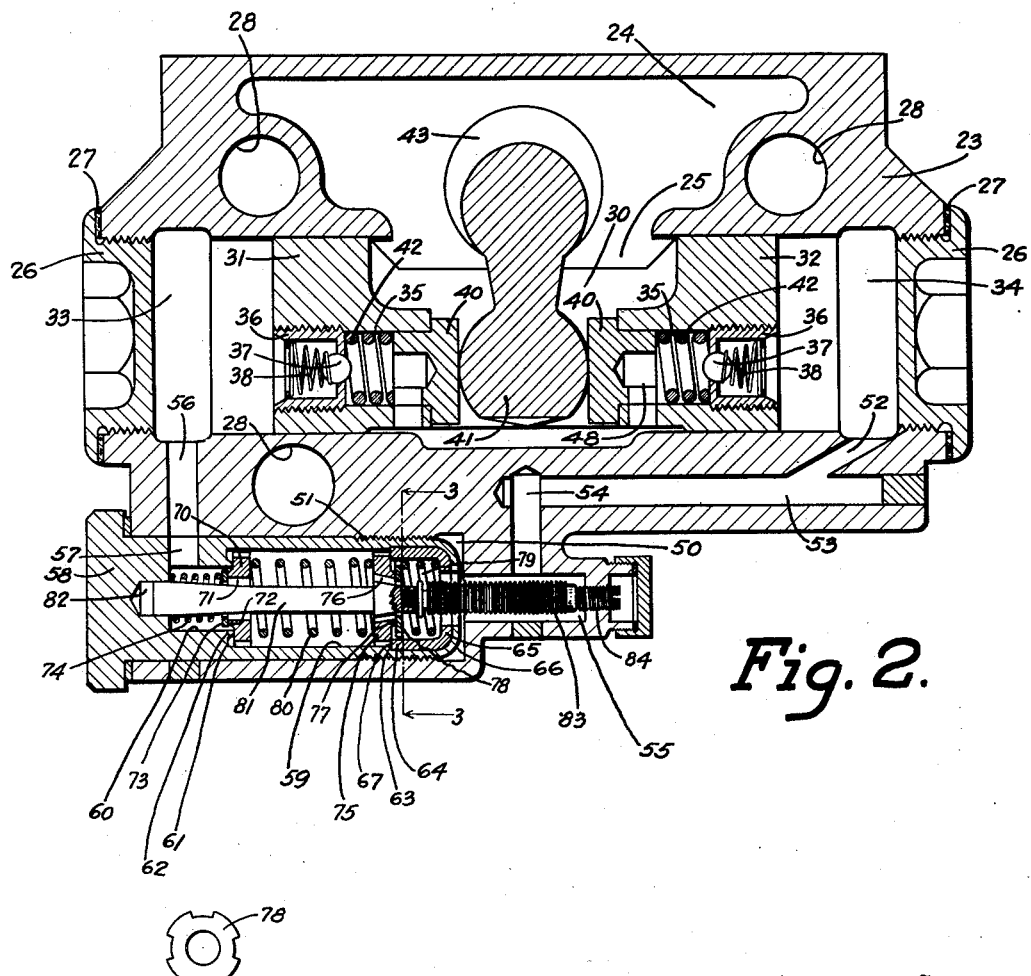
Fig. 2.
Fig. 3.
Inventor
Edwin F. Rossman
By Spencer, Hardman and Fehr
His Attorneys Patented Oct. 20, 1931

1,828,446

UNITED STATES PATENT OFFICE

EDWIN F. ROSSMAN, OF DAYTON, OHIO, ASSIGNOR TO DELCO PRODUCTS CORPORATION, OF DAYTON, OHIO, A CORPORATION OF DELAWARE

SHOCK ABSORBER

Application filed January 4, 1930. Serial No. 418,638.

This invention relates to improvements in hydraulic shock absorbers adapted to cushion shocks or jars resulting from striking obstructions or ruts in the roadway, and for checking the rebounding of the vehicle springs.

It is among the objects of the present invention to provide a hydraulic shock absorber of the double-acting type with a fluid flow control device, comprising a minimum of parts for controlling the flow of fluid in said shock absorber.

Another object of the present invention is to provide a fluid flow controlling element in a shock absorber which is of a unitary structure, so that said fluid flow controlling device may easily be removed for purposes of replacement or readjustment.

Further objects and advantages of the present invention will be apparent from the following description, reference being had to the accompanying drawings, wherein a preferred embodiment of one form of the present invention is clearly shown.

In the drawings:

Fig. 1 is a fragmentary side view of a vehicle chassis with the vehicle wheels omitted for the sake of clearness, a shock absorber including the present invention being applied thereto.

Fig. 2 is a longitudinal sectional view taken through the shock absorber.

Fig. 3 is a flat view of a ring valve taken along the line 3—3 of Fig. 2.

Referring to the drawings, the numeral 20 designates the frame of the vehicle which is supported by springs 21 upon an axle 22.

The shock absorber comprises a casing 23, presenting a fluid reservoir 24 and a cylinder 25. The open ends of the cylinder 25 are closed and sealed by screw caps 26, each of which is provided with a gasket 27 to prevent fluid leaks. Openings 28 are provided in the casing for receiving bolts by which the shock absorber is attached to the frame 20.

Within the cylinder 25 there is provided a fluid displacement member or piston 30, having head portions 31 and 32 respectively. This fluid displacement member forms two compression chambers 33 and 34 at the respective ends of the cylinder.

As shown in Fig. 2, piston head portions 31 and 32 are each provided with a valve mechanism which in the present instance may be termed a fluid replenishing valve, being adapted to add fluid to the supply within the compression chamber on certain strokes of the fluid displacement member. Inasmuch as the valve structure for each piston head portion is alike, only one of them will be described detailedly.

The piston head portion has a longitudinal passage 35, the outer end of which is screw-threaded for receiving the valve cage 36. Valve cage 36 has an end wall presenting a valve seat for the ball check valve 37. A spring 38 urges the ball check valve 37 into engagement with its valve seat. A wear piece 40 has a shank portion which extends into the inner end of the longitudinal passage 35. This wear piece is engaged by the free end of the rocker lever 41. A spring 42 interposed between the wear piece 40 and the valve cage 36 urges the wear piece into constant engagement with the rocker lever 41 whereby wear of either the wear piece or the lever is automatically compensated for.

The rocker lever 41 is supported by rocker shaft 43 which in turn is journalled in bearings provided by the casing 23. One end of the rocker shaft 43 extends outside the casing 23 and is provided with the shock absorber operating arm 44. The free end of arm 44 is swivelly secured to a connecting link 45, said connecting link also being swivelly attached to the bracket 46, which in turn is anchored to the axle 22 by the member 47.

From the aforegoing it may be seen that, due to the connection between the axles and the rocker shaft 43, piston 30 will be moved toward the left as regards Fig. 2 when the axle 22 is moved toward the frame 20 due to the road wheels, not shown, striking an obstruction or a rut in the roadway over which the vehicle is being operated. The piston 30 moving toward the lever as regards Fig. 2 will exert a pressure upon the fluid in compression chamber 33. The piston head portion 32 as it moves toward the left will increase the cubical contents of the compression chamber 34, and, if any fluid has leaked from this side of the chamber, valve 37 may function to permit fluid to flow from the reservoir 24 through transverse passage 48 in the shank portion of the wear piece 40 and then through valve cage 36 into the compression chamber 34 to replenish the fluid supply therein. As the axle 22 moves away from the frame 20 due to the action of springs 21, the movement of the piston 30 is reversed, that is, it will move toward the right as regards Fig. 2 and thus fluid within the compression chamber 34 will have pressure exerted thereon.

The casing 23 presents a valve chamber 50 provided with interior screw threads 51. Valve chamber 50 is in communication with both compression chambers 33 and 34 respectively. The inner end of the valve chamber communicates with compression chamber 34 through passages 52, 53, 54 and 55. Compression chamber 33 is in communication with the valve chamber 50 adjacent its outer end, through passages 56 and 57, the former being provided in the casing, the latter aligning with the former and being provided in the housing plug 58. Housing plug 58 fits snugly into the valve chamber 50 and has screw threads adapted to engage with the screw threads 51 in the chamber whereby the plug is secured within the said chamber. The housing plug 58 is recessed as at 59 and 60, the recess 59 being of greater diameter than the recess 60 so that a shoulder 61 is presented. On the shoulder 61 there is an annular ridge 62 forming an annular valve seat about the recess 60. Within the larger diameter recess portion 59 of the housing plug 58 there is provided an annular shoulder 63 upon which sleeve 64 is adapted to be seated, said sleeve 64 having its one edge turned inwardly as at 65. The outer end of the plug housing 58 is spun over the flanged end of the sleeve 64 as at 66 whereby said sleeve is urged upon the shoulder 63 and maintained in proper position within the plug housing 58. The inner end of sleeve 64 presents a valve seat 67 oppositely disposed from the valve seat 62.

The plug housing 58 provides a unitary container for the pressure release valves of the shock absorber which control the flow of fluid between the compression chambers 33 and 34. One of these pressure release valves comprises a disc valve 70 adapted to engage the valve seat 62, said disc valve having a central opening 71. On the side of the disc valve 70 engaging the valve seat 62, an annular ledge 72 is provided which surrounds the central opening 71. This ledge 72 provides a valve seat for the ring-shaped valve 73, the outer diameter of which is comparatively greater than the central opening 71 of the disc valve, the inner diameter thereof, however, being substantially less than said central opening 71. A spring 74 interposed between the inner wall of the recess 60 and the ring valve 73 yieldably urges said ring valve 73 upon the seat 72 provided by its associate disc valve 70. The other pressure release valve comprises a disc valve 75 similar to the disc valve 70, said disc valve 75 having a central opening 76 and presenting an annular ridge 77 on the side of the disc valve engaging the valve seat 67 provided by the sleeve 64. A ring valve 78 similar to the ring valve 73 is urged into engagement with the valve seat 77 by a spring 79 which is interposed between the angular flanged end 65 of the sleeve 64 and said valve 78. A common spring 80 is interposed between the disc valves 70 and 75, yieldably urging said disc valves into engagement with their respective valve seats 62 and 67.

A metering pin 81 extends through the valves 73—70 and 75—78, the one end of the metering pin 81 being slidably supported within a recess 82 in the head portion of the plug housing 58, the other end of said metering pin being attached to the one end of a thermostatic element 83, the opposite end of said thermostatic element being screw threadedly supported in the casing as at 84. The parts of the metering pin extending through the respective ring valves 73 and 78 respectively are tapered, both in the same direction, whereby the orifice presented between the respective inner peripheral edges of the said ring valves and the tapering portions of the metering pin may be varied by the longitudinal adjustment of said metering pin, which adjustment is obtained either by the manual adjustment of the thermostatic element 83 or its automatic adjustment through temperature changes. Manual adjustment is obtained by turning the thermostatic element relative to the casing, the screw threads at the point 84 moving said metering pin back and forth in accordance with the direction of its rotation. The automatic adjustment of the pin is attained by the expansion or contraction of the element 83 due to temperature changes. Adjustment of the metering pin 81 controls the flow of fluid through the pressure release valves.

The device operates in the following manner:

Upon striking an obstruction in the roadway the vehicle wheels, not shown, will move the axle 22 toward the frame 20 and thus, as has been described, piston 30 will be moved toward the left as regards Fig. 2, causing pressure to be exerted upon the fluid within the compression chamber 33. This fluid will be forced through passages 56 and 57 into the recess 60 and then through the orifice provided between ring valve 73 and the metering pin 82. This orifice restricts the flow of fluid and consequently the movement of the springs 21 toward the frame 20 is resisted. After passing the ring valve 73 the fluid will flow through the central opening 71 in the disc valve 70, enter the chamber provided by recess 59 and then said fluid will flow through the central opening 76 in the disc valve 75, the pressure moving the valve 78 from its seat against the effect of spring 79, thus permitting the fluid to flow past the valve 78 into the passage 55 which communicates with the chamber containing spring 79 and thence through passages 54, 53 and 52 into the compression chamber 34. The orifice provided between the ring valve 73 and the metering pin 81 will control the fluid flow within certain limits. If the movement of the axle 21 is extended, causing excessive pressures to be exerted upon the fluid within compression chamber 33, this orifice is too small to take the entire flow and in this case the excessive pressure within the recess 60 will move the disc valve 70 from its seat 62 against the effect of spring 80, and thus an additionally restricted flow into the recessed portion 59 will result. This excessive flow will move the valve 78 further from its seat, permitting the fluid to flow unrestricted into the sleeve 64 and thence through passages 55, 54, 53, and 52 into the compression chamber 34.

As soon as the springs 21 have reached the limit of their flexure caused by the particular obstruction met, they will have a tendency to return to normal, unflexed position with a sudden, rebounding movement which, if not controlled, will result in uncomfortable jars and jolts being transmitted to the frame 20 of the vehicle. The present device checks the return of the springs 21 to normal, unflexed position. As the springs reverse their movement, the movement of the piston 30 will be reversed, that is, said piston will be moved toward the right as regards Fig. 2. Pressure now exerted upon the fluid in compression chamber 34 will force said fluid through passages 52, 53, 54 and 55 into the sleeve 64, the flow then being restricted by the orifice presented between valve 78 and the metering pin portion extending therethrough. After passing through this orifice and through the opening 76 and the disc valve 75, the fluid will flow through the recess chamber 59 central opening 71 in disc valve 70 against the valve 73, moving it against the effect of its spring 74 so that the fluid will flow around said valve 73 into the recess 60 and thus through passages 57 and 66 into the compression chamber 33. Excessive pressure in the compression chamber 34 will move the disc valve 75 from engagement with the seat 67 and consequently an additionally restricted flow will be established from the compression chamber 34 into the compression chamber 33 in a manner similar to that previously described in connection with the reverse flow of fluid.

A temperature responsive element or thermostat 83 is provided for setting or adjusting the metering pin 81 in relation to the valves associated therewith. In the present drawings the thermostat 83 is illustrated in the form of a bellows in which an element, expansible and contractable in response to temperature changes, is contained. Bellows of this type are well known in the art.

Metering pin 81 may also be set manually by the turning of the thermostatic element 83 in the housing portion 84 whereby the orifices provided between the metering pin and the respective valves 73 and 75 may be varied. When through temperature changes the viscosity of the fluid alters, the thermostatic element 83 will automatically function to compensate for such change in viscosity. For instance, in colder weather when the fluid within the shock absorber will not flow so readily, the thermostatic element 83 will operate automatically to move the metering pin 81 to increase the size of the orifices between the valves 73 and 75 and said pin 81. Upon rising temperatures when the fluid will flow more freely, contraction of the thermostatic element 83 results, causing the orifices to again be reduced.

Applicant has provided a shock absorber having a pressure release device including a minimum number of parts adapted to establish fluid flows in either direction, said pressure release devices each comprising compound valves adapted to restrict the flow of fluid in one direction and to establish substantially less restricted flows in the opposite direction. It will be seen that the pressure release valve of each compression chamber restricts the flow of fluid from its respective compression chamber in response to the fluid pressure in said chamber while the flow into said compression chamber is comparatively less restricted.

While the form of embodiment of the present invention as herein disclosed, constitutes a preferred form, it is to be understood that other forms might be adopted, all coming within the scope of the claims which follow.

What is claimed is as follows:

1. A shock absorber comprising in combination, a casing presenting a cylinder and a fluid reservoir; a piston in said cylinder forming a compression chamber at each end thereof; a valve chamber in communication with both compression chambers; compound valve mechanisms in said valve chamber, each mechanism having two oppositely acting pressure release valves; and a single resilient member urging said valve mechanisms into normal position.

2. A shock absorber comprising in combination, a casing presenting a cylinder and a fluid reservoir; a piston in said cylinder forming a compression chamber at each end thereof; a valve chamber in communication with both compression chambers; oppositely acting, compound pressure release valves in said valve chamber; each valve being adapted to establish successively, two flows of fluid in response to increasing pressures; and a single spring urging said valves into normally closed position.

3. A shock absorber comprising in combination, a casing presenting a cylinder and a fluid reservoir; a piston in said cylinder forming a compression chamber at each end thereof; a valve chamber in communication with both compression chambers, said valve chamber providing a valve seat at each end thereof; oppositely acting pressure release valves at each end of said valve chamber, each valve being adapted to establish successively a constantly restricted flow and a variably restricted flow of fluid in response to increasing pressures; and a single spring interposed between said valves, yieldably urging said valves upon their respective valve seats.

4. A shock absorber comprising in combination, a casing presenting a cylinder and a fluid reservoir; a piston in said cylinder forming a compression chamber at each end thereof; a valve chamber in communication with both compression chambers; a metering pin within said valve chamber; two apertured, oppositely acting pressure release valves about said metering pin at each end of the valve chamber; and a single spring interposed between said valves, yieldably urging them into engagement with their respective valve seats.

5. A shock absorber comprising in combination, a casing presenting a cylinder and a fluid reservoir; a piston in said cylinder forming a compression chamber at each end thereof; a valve chamber in communication with both compression chambers; a metering pin within said valve chamber; two oppositely acting pressure release valves at each end of said valve chamber, each valve comprising a disc valve having a central opening through which the metering pin extends, and a ring-shaped valve engaging the disc valve on the side adjacent its valve seat and having the metering pin extending therethrough; a single spring interposed between said disc valves, yieldably urging them upon their respective valve seats; and springs urging the ring-valves upon their respective disc valves.

6. A shock absorber comprising in combination, a casing presenting a cylinder and a fluid reservoir; a piston in said cylinder forming a compression chamber at each end thereof; a valve chamber in communication with both compression chambers; two oppositely acting pressure release valves at each end of said valve chamber; each valve comprising two valve members adapted respectively to establish successive flows toward the opposite pressure release valve only one of said valve members of each valve being operable to establish a flow in the opposite direction; and a single spring urging the two oppositely acting valves into engagement with their respective valve seats.

7. A shock absorber comprising in combination, a casing presenting a cylinder and a fluid reservoir; a piston in said cylinder forming a compression chamber at each end thereof; a valve chamber in communication with both compression chambers; two oppositely acting pressure release valves at the respective ends of said valve chamber; each valve comprising, a disc valve member having a central opening, a ring-shaped valve member adapted to seat upon the disc valve on the side thereof which engages the valve seat, a metering pin extending through both valve members; a single spring interposed between the disc valve members of both pressure release valves, yieldably urging them into engagement with their respective valve seats; and a coil spring urging each ring-shaped valve member into seating engagement with its respective disc valve member.

8. A shock absorber comprising in combination, a casing presenting a cylinder and a fluid reservoir; a piston in said cylinder forming a compression chamber at each end thereof; a valve chamber in communication with both compression chambers; two compound and oppositely acting pressure release valves in said valve chamber; each valve comprising two cooperating valve members and a metering pin extending through said members, both the members of a valve being adapted successively to establish restricted flows of fluid toward the opposite valve, only one member of each valve being adapted to establish a flow of fluid in the opposite direction.

9. A shock absorber comprising in combination, a casing presenting a cylinder and a fluid reservoir; a piston in said cylinder forming a compression chamber at each end thereof; a valve chamber in communication with both compression chambers; two compound and oppositely acting pressure release valve mechanisms in said valve chamber; each valve mechanism comprising two cooperating valve members one of which is adapted to established a constantly restricted flow toward the opposite valve in response to fluid pressures within certain limits, the other member being adapted to establish an additional, variably restricted flow in the same direction in response to increased fluid pressures, only the first mentioned valve member being adapted to establish a flow of fluid in the opposite direction; a single spring urging the one valve member of each valve upon its respective valve seat; and a coil spring urging the other valve member of each valve upon its associate valve member.

10. A shock absorber comprising in combination, a casing presenting a cylinder and a fluid reservoir; a piston in said cylinder forming a compression chamber at each end thereof; a valve chamber in communication with both compression chambers; a compound pressure relief valve for each compression chamber, provided within the valve chamber, each compound pressure relief valve being adapted to establish a flow of fluid into and from its respective compression chamber, the flows of fluid from the said compression chambers being restricted more greatly than the flow into said compression chambers.

11. A shock absorber comprising in combination, a casing presenting a cylinder and a fluid reservoir; a piston in said cylinder forming a compression chamber at each end thereof; a valve chamber in communication with both compression chambers; a metering pin within said valve chamber; a compound pressure release valve mechanism for each compression chamber provided in said valve chamber, each of said valve mechanisms having a valve member adapted to cooperate with metering pin to restrict the initial flow of fluid from its respective compression chamber and to operate to establish a substantially less restricted flow into its compression chamber.

12. A shock absorber comprising in combination, a casing presenting a cylinder and a fluid reservoir; a piston in said cylinder forming a compression chamber at each end thereof; a valve chamber in communication with both compression chambers; a metering pin within said valve chamber; a compound pressure release valve unit for each compression chamber provided in said valve chamber, each pressure release valve unit having two cooperating valve members, one of which cooperates with the metering pin to restrict the initial flow of fluid from its respective valve chamber, the other being operable by fluid pressure to establish an additionally restricted flow of fluid from its respective compression chamber independently of the metering pin.

13. A shock absorber comprising in combination, a casing presenting a cylinder and a fluid reservoir; a piston in said cylinder forming a compression chamber at each end thereof; a valve chamber in communication with both compression chambers; a metering pin within said valve chamber; a compound pressure release valve assembly for each compression chamber provided in said valve chamber, each pressure release valve assembly having two cooperating valve members, one of which cooperates with the metering pin to restrict the initial flow of fluid from its respective valve chamber, the other being operable by fluid pressure to establish an additionally restricted flow of fluid from its respective compression chamber independently of the metering pin, the first mentioned valve member being movable relative to the second mentioned valve member to establish a substantially less restricted flow of fluid into its respective compression chamber.

14. A shock absorber comprising in combination, a casing presenting a cylinder and a fluid reservoir; a piston in said cylinder forming a compression chamber at each end thereof; a valve chamber in communication with both compression chambers and providing two valve seats; a compound pressure release valve mechanism for each compression chamber provided in the valve chamber, each valve mechanism comprising two valve members, one of which provides a seat for the other, both being adapted to establish a restricted flow of fluid from the respective compression chamber, the valve member which is seated upon the other being the only one adapted to establish a flow into the said respective compression chamber.

15. A shock absorber comprising in combination, a casing presenting a cylinder and a fluid reservoir; a piston in said cylinder forming a compression chamber at each end thereof; a valve chamber in communication with both compression chambers and providing two valve seats; a compound pressure release valve mechanism for each compression chamber provided in the valve chamber, each valve comprising two valve members, one of which is adapted to engage a respective valve seat in the valve chamber, said valve member providing a valve seat for the other valve member, both valve members being adapted, separately to establish restricted flows of fluid from their respective compression chambers, the valve member seated upon the other valve member being adapted to establish a substantially less restricted flow into its respective compression chamber.

16. A shock absorber comprising in combination, a casing presenting a cylinder and a fluid reservoir; a piston in said cylinder forming a compression chamber at each end thereof; a valve chamber in communication with both compression chambers and providing two valve seats; a compound pressure release valve mechanism for each compression chamber provided in the valve mechanism chamber, each valve comprising two valve members, one of which is adapted to engage a respective valve seat in the valve chamber, said valve member providing a valve seat for the other valve member, both valve members being adapted, separately to establish restricted flows of fluid from their respective compression chambers, the valve member seated upon the other valve member being adapted to establish a substantially less restricted flow into its respective compression chamber; a single spring interposed between the two valve members engaging the valve seats in the valve chamber, yieldably to urge said members upon their respective valve seats; and separate springs urging the other valve members of the compound valves upon their associate valve members.

17. A shock absorber comprising in combination a casing presenting a cylinder and a fluid reservoir; a piston in said cylinder forming a compression chamber at each end thereof; a valve chamber in communication with both compression chambers; a metering pin in said valve chamber; and two oppositely acting valve assemblies in said chamber, each valve assembly comprising two valves cooperating with said metering pin to establish restricted flows of fluid from its respective compression chamber, each valve being adapted to be operated by fluid pressure to establish a less restricted flow of fluid into its respective compression chamber.

18. A shock absorber comprising in combination, a casing presenting a cylinder and a fluid reservoir; a piston in said cylinder forming a compression chamber at each end thereof; a valve chamber in communication with both compression chambers; valve seats provided in the valve chamber; a valve mechanism for each compression chamber, each mechanism comprising valves adapted to engage said valve seats, said valves being movable from said seats by fluid pressure to establish a flow of fluid toward their respective compression chambers; and a metering pin adapted to cooperate with all of said valves for establishing a substantially constantly restricted flow of fluid from their respective compression chambers.

19. A shock absorber comprising in combination, a casing presenting a cylinder and a fluid reservoir; a piston in said cylinder forming a compression chamber at each end thereof; a valve chamber in communication with both compression chambers; valve seats provided within the valve chamber; a disc valve adapted to engage each valve seat, each disc valve having a central opening; a spring interposed between said disc valves yieldably urging them upon their respective valve seats; an apertured valve member engaging each disc valve on the side thereof engaging the valve seat; springs urging said valve members upon their respective disc valves; and a metering pin having tapering portions extending through the valves and cooperating therewith to establish substantially constantly restricted flows of fluid from the respective compression chambers.

20. A shock absorber as defined by claim 4, in which a thermostatic element is connected to the metering pin for adjusting said pin relative to the valves to vary the fluid flow in accordance with temperature conditions.

21. A shock absorber as defined by claim 5, in which a temperature controlled member is connected between the metering pin and casing, said member being adapted to move the pin relative to the valve members in response to temperature variations, whereby orifices are varied to compensate for variations in fluid viscosity.

22. A shock absorber as defined by claim 12, in which a bellows is connected between one end of the metering pin and the casing, said bellows containing an element which, in response to temperature changes will expand or contract the bellows to adjust the pin to compensate for variations in fluid viscosity.

23. A shock absorber as defined by claim 18 in which the one end of the metering pin is slidably carried by the casing, the other end of said pin being attached to a thermostatic element supported by the casing, said element adjusting the metering pin relative to the valves whereby to adjust the orifices to compensate for changes in fluid viscosity.

In testimony whereof I hereto affix my signature.

EDWIN F. ROSSMAN.